July 8, 1952 H. F. FLOWERS 2,602,401
TANDEM WHEEL TRUCK
Filed April 10, 1946 2 SHEETS—SHEET 1
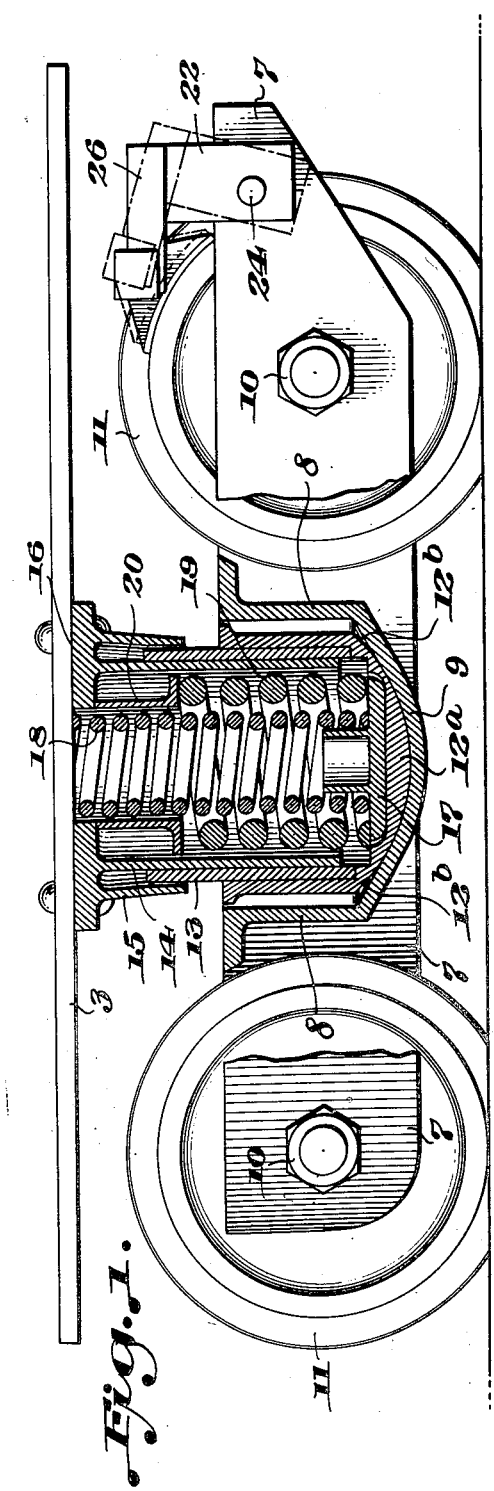
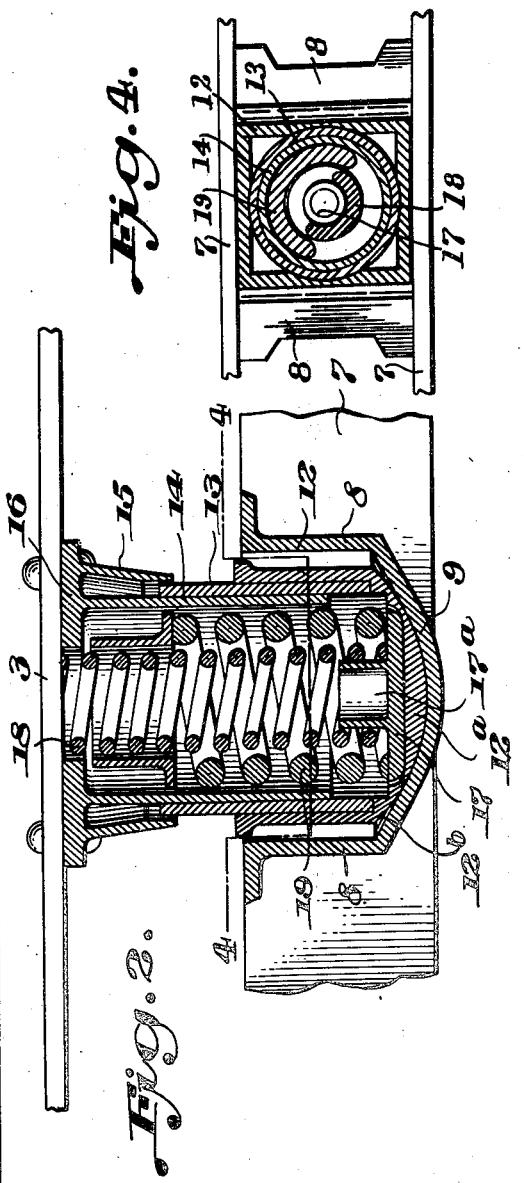
INVENTOR.
Henry Ford Flowers
BY
Mason, Porter, Diller & Stewart
ATTYS.

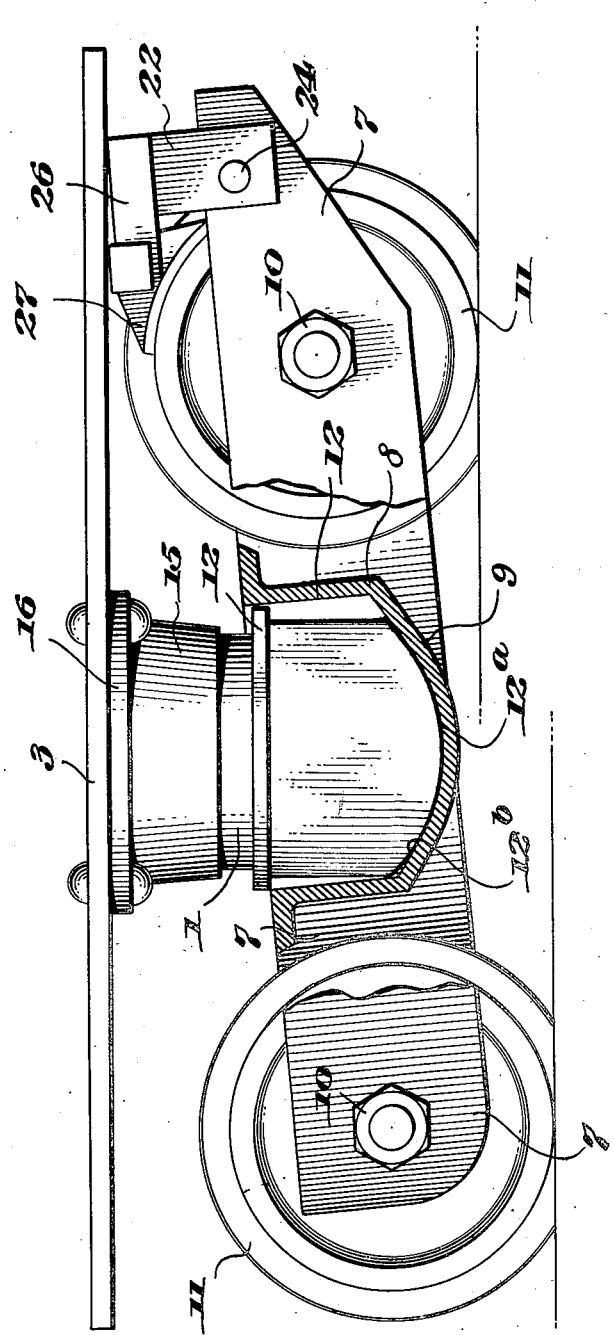

Patented July 8, 1952

2,602,401

UNITED STATES PATENT OFFICE 2,602,401

TANDEM WHEEL TRUCK

Henry Fort Flowers, Findlay, Ohio

Application April 10, 1946, Serial No. 660,990
In Great Britain November 7, 1945

3 Claims. (Cl. 105—199)

In my prior Patent No. 2,078,915, granted April 27, 1937 there is shown and described a tandem wheel truck wherein a king post rigidly carried by the vehicle body fits within a body supporting member carried by the wheel truck, and wherein said king post moves vertically in the body supporting member while the body supporting member can turn about the center of the king post as an axis. This body supporting member is in turn mounted on the truck frame so that it may shift relative thereto to permit the truck frame to oscillate in the vertical plane of the wheels.

Disposed between the king post and the body supporting member is a heavy and a light spring, both of which are active in supporting the body for all loads.

The present invention has to do with an improvement in the construction of the king post and the body supporting member therefor, and the spring means interposed between the king post and the body supporting member.

An object of the present invention is to provide a body supporting member with a hardened wear-resisting replaceable sleeve which is disposed between the body support and the king post, which sleeve is press fitted into the body supporting member and makes a tight sliding and oscillating fit with the king post.

A further object of the invention is to provide a spring supporting means for the body which includes a light spring and a heavy spring and wherein the heavy spring is inactive under light loads and becomes active to aid in supporting the body under heavy loads.

A still further object of the invention is to provide a dust guard which is formed as a part of the supporting means for the king post and which serves to seal the dirt away from the close fitting surfaces between the king post and the replaceable sleeve in which it is mounted.

These and other objects will in part be obvious and will in part be hereinafter more fully disclosed.

In the drawings—

Figure 1 is a view partly in side elevation and partly in section showing a tandem wheel truck and the body supporting mechanism having embodied therein the improvements;

Figure 2 is a vertical sectional view through the body supporting devices on the wheel truck and showing the position of the parts under light load;

Figure 3 is a view partly in side elevation and partly in section showing the wheel frame as shifted on the body supporting member.

Figure 4 is a view, partly in plan and partly in section on the line 4—4 of Figure 2, of the central portion of the wheel frame and showing the supporting gimbal, the hardened sleeve, the king post and the supporting springs on which the body member of the vehicle is carried.

In the drawings only a portion of the vehicle body is shown. Instead of the usual form of bolster there is a heavy floor plate 3 which forms one of the bottom plates of the vehicle body. This vehicle body is shown in detail in my copending application Serial No. 670,148 filed May 16, 1946, patented February 8, 1949, No. 2,461,263.

The king post is in the form of a hardened steel sleeve 14 which is welded to a plate 16 and the plate 16 is welded or riveted to the floor plate 3. Associated with the king post is a wheel truck which includes side frames 7, 7 formed of heavy plates. These side plates are connected together by transverse angle plates 8, 8 and a semi-cylindrical gimbal supporting plate 9. These plates are welded together and to the side plates, thus making a very rigid wheel frame. The ends of the side frames are connected by spindles 10, 10 which extend from one frame to the other, and mounted on these spindles are flanged wheels 11, 11. These wheel spindles rigidly connect the side members and further aid in forming a rigid wheel frame structure.

Mounted on the gimbal supporting plate is a body supporting member or gimbal 12 (see Figures 1 to 4). Carried by this body supporting member is a hardened steel sleeve 13. This sleeve is made of comparatively thin metal and is press fitted into the gimbal. This sleeve projects above the gimbal but makes sufficient contact therewith so that the cylindrical formation of the sleeve is maintained. The king post 14 which is also of hardened steel fits closely within this hardened sleeve 13 carried by the gimbal. This sleeve 13 is a wear-resisting sleeve which can be replaced when worn. The king post is free to move up and down or vertically in the hardened sleeve 13 and the hardened sleeve is free to turn on the king post about a vertical axis disposed centrally of the king post.

The gimbal supporting member 9, as stated above, is semi-cylindrical with the axis of the cylinder extending transversely of the wheel frame and at right angles to the plane of the wheels. The lower end 12a of the body supporting gimbal is likewise semi-cylindrical where it contacts with this gimbal supporting member. The gimbal is spaced away from the cross plates 8, 8 so that said gimbal can shift on this semi-cylindrical supporting plate 9. This permits the wheel frame to oscillate about a horizontal axis to a limited extent and takes care of any unevenness or changing elevation in the rails on which the wheels run. The bottom plate 12a where it joins the end members of the gimbal are cut away as indicated at 12b so as to prevent digging into the supporting plate 9 as it shifts along the face thereof. The gimbal 12 is provided with supporting devices which make contact with the side frames, as shown in my prior patent, so that the wheel frame is capable of oscillating in the plane of the wheels but is otherwise restrained from movement on the gimbal. Specifically the gimbal includes side members parallel with and having sliding contact with the side frame members and transversely extending end members which are rigidly connected to said side members and the bottom plate 12a which in turn is also rigidly connected to the side and end members. The hardened steel sleeve 13 is press fitted into contact with the side and end members of the gimbal as shown in Figure 4. Mounted on the inner face of the bottom member 12a of the gimbal is an abutment plate 17 having a central rigid sleeve 17a.

A light spring 18 encircles this central sleeve and bears against the abutment plate 17. This spring at its upper end extends through an opening in the plate 16 and bears against the floor plate 3. Also mounted on the abutment plate 17 is a heavy spring 19. This heavy spring is much shorter than the light spring and a flanged abutment sleeve 20 rests on the upper end of the heavy spring. This sleeve under light loads is spaced away from the plate 16, but under heavy loads the sleeve will abut against the plate 16. In Figure 1 the sleeve 20 is in abutment against the plate 16 while in Figure 2 it is spaced away from said plate. Figure 1, therefore, shows both the light spring and the heavy spring as active in supporting the load, while in Figure 2 the light spring alone supports the load and the heavy spring is inactive.

Secured to the plate 16 is a depending guard sleeve 15 which is dimensioned and positioned so that it extends slightly below the hardened sleeve 13 under light load. Thus, under both light and heavy loads, this guard seals the dirt away from the close fitting surfaces between the king post and the hardened sleeve 13.

In Figure 1 of the drawings there is shown a brake cage pivoted at 24 to the side frames of the wheel truck. The brake cage includes supporting members 22 from which project members 26, between which the brake shoe 27 is pivoted. This braking mechanism forms no part of the present invention, but is shown, described and claimed in the copending application, supra.

It is thought that the operation of the wheel supporting truck is clear from the description given in detail above. When the vehicle is passing along a curved track the flanges on the wheels will cause the wheel truck to follow the curved path of travel and the gimbal 12 will turn about a vertical axis to permit this turning movement of the wheel truck. When the track is uneven or changes in elevation occur, the gimbal 12 will slide along the gimbal supporting plate 9 and thus the wheel truck oscillates about a horizontal axis. The load is carried on the springs disposed within the gimbal and the king post, and when the load is light it will be supported solely by the light spring and the body is free to move up and down, at which time the king post 14 will slide up and down within the close fitting steel sleeve 13. Under heavy loads the heavy spring becomes active to aid in supporting the load and the body can move up and down in the manner just stated.

It is obvious that minor changes may be made in the details of construction without departing from the spirit of the invention as set forth in the appended claims.

I claim:

1. The combination of a vehicle body member, a cylindrical king post rigidly connected thereto, a wheel truck on which said king post is mounted, said wheel truck including side frames, wheels mounted on said side frames in tandem, transverse angle plates and a semi-cylindrical plate secured together and to said side frames for connecting the same and forming a gimbal support, side members having sliding contact with the side frames, transverse members connecting said side members, a semi-cylindrical bottom plate rigidly connected to said side and transverse members and forming a gimbal which is rectangular in cross section, a hardened steel cylindrical sleeve replaceably mounted and rigidly contacting said gimbal at opposite sides thereof in which the king post makes close sliding and oscillating fit, said hardened steel sleeve extending above the gimbal and forming a lateral support for the king post, and spring means between the gimbal and said body member for supporting the same.

2. The combination of a vehicle body member, a plate rigidly attached to the underface thereof, a cylindrical king post rigidly connected to said plate, a wheel truck on which said king post is mounted, said wheel truck including side frames and wheels mounted on said side frames in tandem, transverse angle plates and a semi-cylindrical plate secured together and to the side frames for connecting the same and forming a gimbal support, side members having sliding contact with said side frames, transverse members connecting said side members and a semi-cylindrical bottom plate rigidly connected to said side and transverse members and forming a gimbal which is rectangular in cross section, a hardened steel cylindrical sleeve replaceably mounted within and rigidly contacting said gimbal at opposite sides thereof in which the king post makes a close sliding and oscillating fit, said hardened steel cylindrical sleeve extending above the gimbal and forming a lateral support for the king post, a depending guard sleeve carried by said king post supporting plate and extending below the upper end of said hardened sleeve under light load, and spring means disposed between the gimbal and said body member for supporting the same.

3. The combination of a vehicle body member, a cylindrical king post rigidly connected thereto, a wheel truck on which said king post is mounted, said wheel truck including side frames, wheels mounted on said side frames in tandem, transverse angle plates and a semi-cylindrical plate secured together and to said side frames for connecting the same and forming a gimbal support, side members having sliding contact with the side frames, transverse members connecting said side members, a semi-cylindrical bottom plate rigidly connected to said side and end members and forming a gimbal which is rectangular in cross section, a hardened steel cylindrical sleeve replaceably mounted and rigidly contacting said gimbal at opposite sides thereof in which the king post makes close sliding and oscillating fit, said hardened steel sleeve extending above said gimbal and forming a lateral support for the king post, an abutment plate in said gimbal, a spring mounted thereon and extending into said king posts and continuously contacting a supporting body member, said spring serving as the sole means associated with the truck for supporting the vehicle body under light load and a second spring mounted on said abutment plate which is out of contact with the body member under light load and makes contact therewith, and serves as an additional support for the body member under heavy load.

HENRY FORT FLOWERS.

REFERENCES CITED

The following references are of record in the file of this patent:

UNITED STATES PATENTS

| Number | Name | Date |
|---|---|---|
| 2,078,915 | Flowers | Apr. 27, 1937 |
| 2,354,458 | Hammerstrom | July 25, 1944 |
| 2,355,450 | Leese | Aug. 8, 1944 |
| 2,482,168 | Grutzner | Sept. 20, 1949 |